United States Patent [19]

Prichard

[11] 4,340,309
[45] * Jul. 20, 1982

[54] TRAILER TRANSIT MIXER

[75] Inventor: Evan S. Prichard, Newport Beach, Calif.

[73] Assignee: Challenge-Cook Bros., Incorporated, Industry, Calif.

[*] Notice: The portion of the term of this patent subsequent to Jan. 6, 1998, has been disclaimed.

[21] Appl. No.: 162,918

[22] Filed: Jun. 25, 1980

Related U.S. Application Data

[63] Continuation-in-part of Ser. No. 57,650, Jul. 16, 1979, Pat. No. 4,243,328.

[51] Int. Cl.³ .......................... B28C 5/20; B28C 5/42
[52] U.S. Cl. .................................... 366/62; 280/404; 280/405 A
[58] Field of Search .................. 366/54, 62, 63, 60, 366/61, 220, 233, 606, 55, 44, 42; 280/404, 407, 401, 405 R, 405 A

[56] References Cited

U.S. PATENT DOCUMENTS

| 3,019,002 | 1/1962 | Prichard | 366/62 |
| 3,112,100 | 11/1963 | Prichard | 366/41 |
| 3,038,704 | 6/1967 | Cook | 280/407 |
| 3,567,189 | 3/1971 | Buelow | 366/62 |
| 3,658,303 | 4/1972 | Funk | 366/62 |
| 3,706,464 | 12/1972 | Burrows | 280/401 |
| 4,212,542 | 7/1980 | Beekenkamp | 366/54 |

Primary Examiner—Robert W. Jenkins
Attorney, Agent, or Firm—Lyon & Lyon

[57] ABSTRACT

A trailer transit mixer is disclosed which includes two oppositely positioned support members at least one of which is pivotably attached to a center frame and to a supporting wheel structure. Power means extend between and are secured to at least one of the support members and the center frame and upon activation the power means cause pivoting of the support members to which they are attached to contract the trailer transit mixer.

12 Claims, 12 Drawing Figures

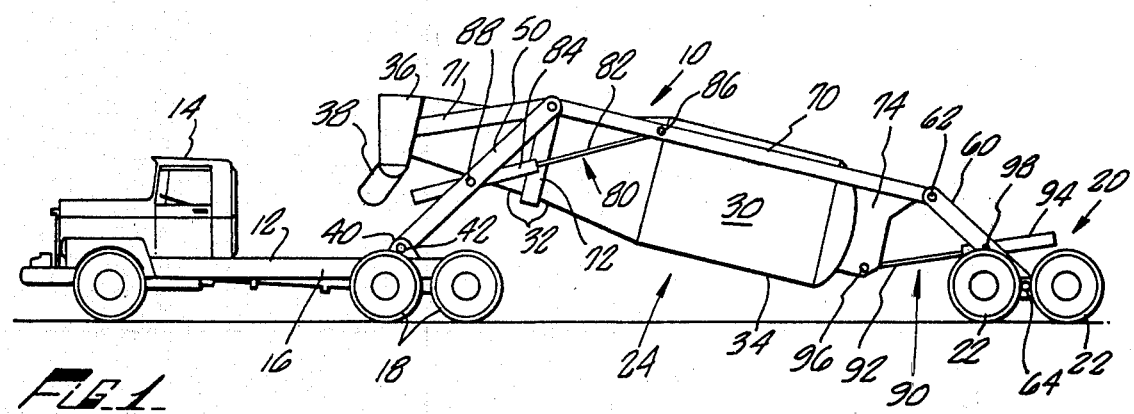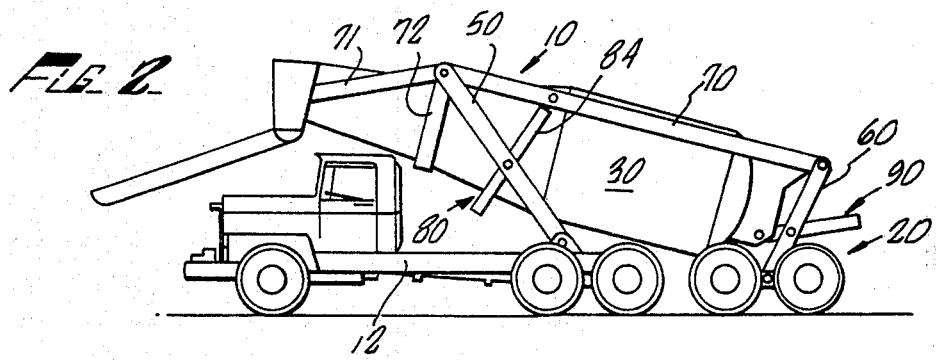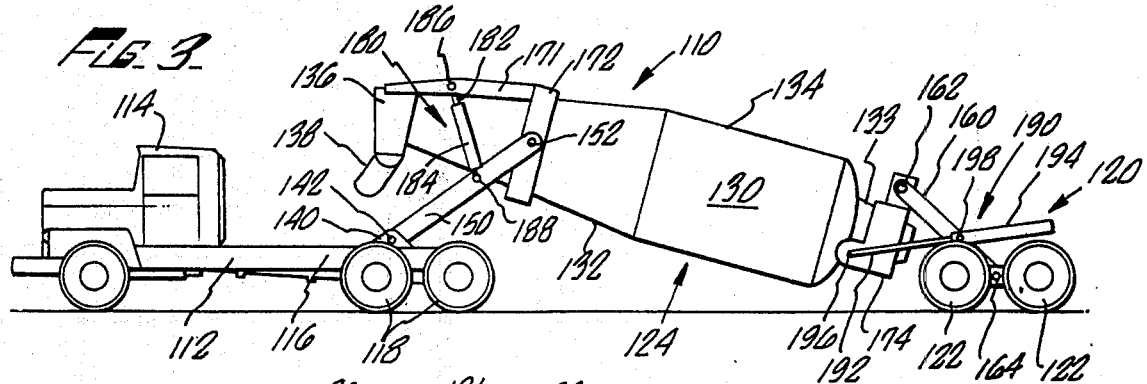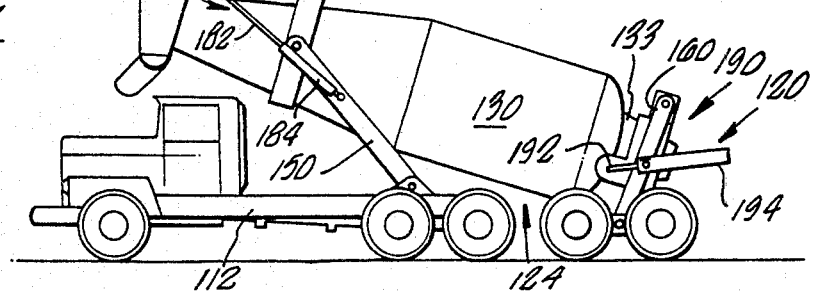

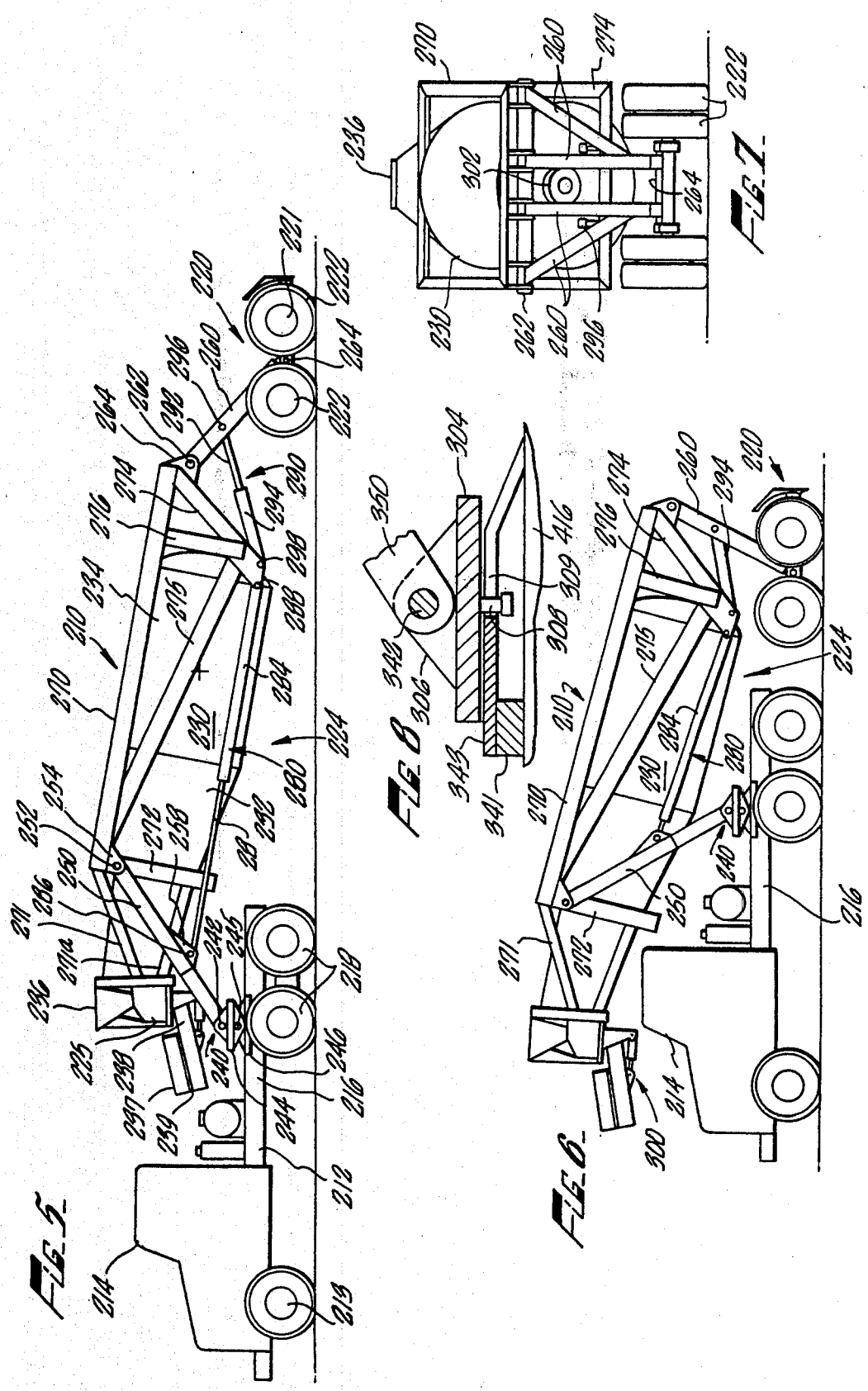

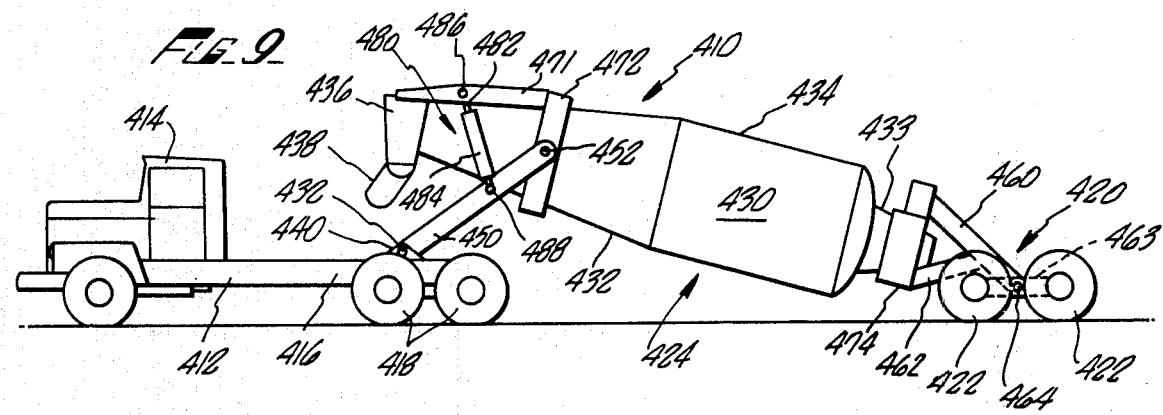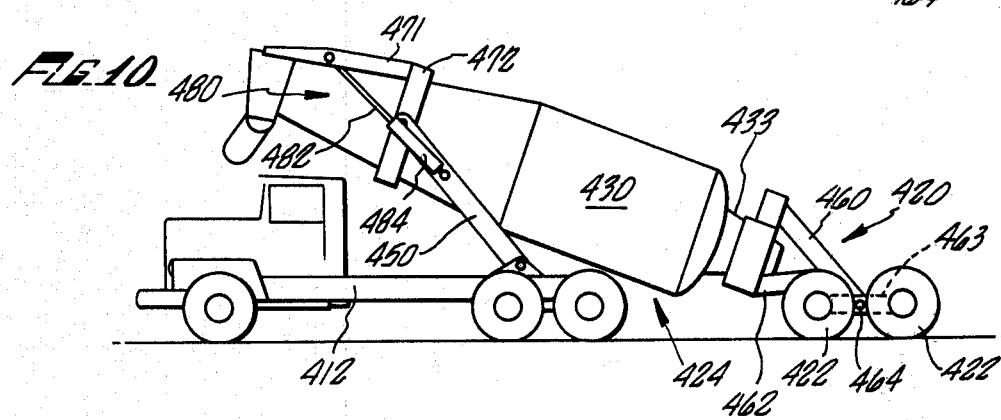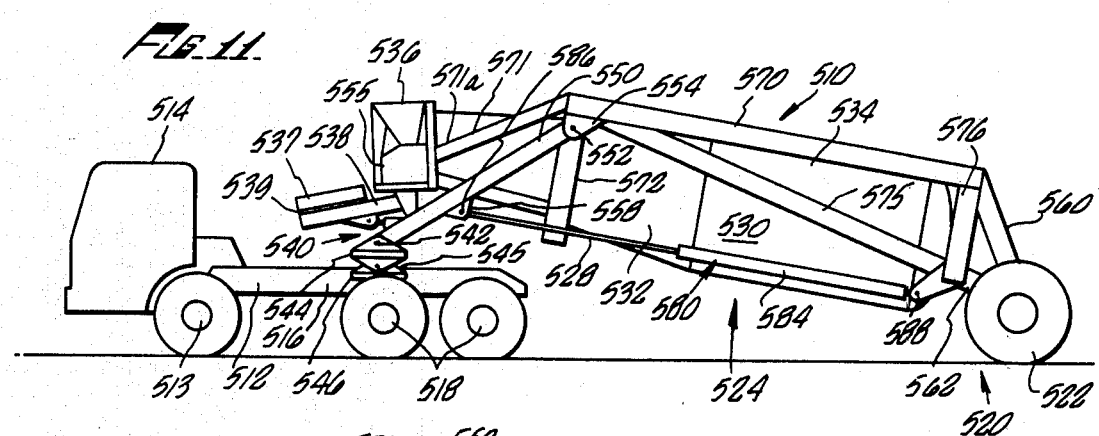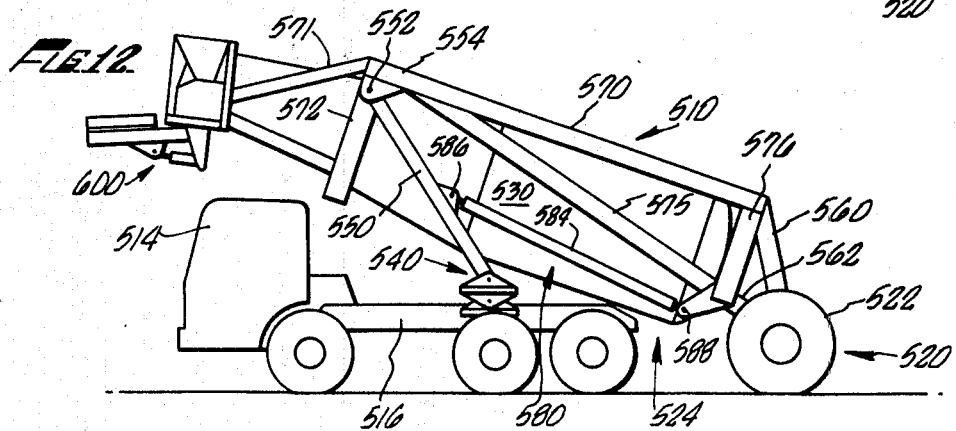

TRAILER TRANSIT MIXER

CROSS-REFERENCE TO RELATED APPLICATION

This is a continuation-in-part of parent application, Ser. No. 57,650, filed July 16, 1979, now U.S. Pat. No. 4,243,328.

BACKGROUND OF THE INVENTION

This invention relates to a transit mixer, and more particularly to a contractible-extendable trailer transit mixer adapted to discharge forwardly of the truck.

The necessity for moving large quantities of building material such as concrete for long distances has resulted in various styled trucks designed to address particular load and terrain requirements. These truck designs were of two basic types. First, and most popular, the mixer drum was mounted on the truck body thereby providing acceptable manueverability of the vehicle. Second, the mixer drum was mounted on a trailer portion which was then secured to the truck body. This particular trailer configuration resulted in greater pay load capability due to better axel load characteristics but sacrificed maneuverability.

Illustrative of the previous forms of trailer transit mixers characterized by a configuration having a trailer to which a mixer drum assembly was mounted to hold the pay load during transit is U.S. Pat. No. 3,038,704. A separate engine or other drive mechanism integral with the truck body was connected to the mixer drum to cause rotation and provide the desired mixing necessary during the transportation or discharge of concrete. The mixer drum was positioned on the trailer with the open end at either the front or rear with discharge chutes mounted at the open end to discharge concrete at the front or rear of the trailer depending upon the operational characteristics desired.

In the configuration of U.S. Pat. No. 3,038,704, the drum was rotatably mounted to point forward on a trialer portion which was slidably engaged with the truck body. However, this form had severely impaired turning capabilities when in the contracted configuration due to the contracted trailer portion extending along side the truck cab.

Other trailer type devices have been used with transit mixers to increase the payload carried by the mixer drum, such as those of U.S. Pat. Nos. 3,019,022 and 3,112,100, but these prior art trailer devices had various limitations and undesirable operational characteristics.

Additionally, due to the highway regulations of the Federal Government, all states and many foreign governments, there are severe restricts on the size and loading of trucks and trailers that use public roads. In particular, various limitations exist directed to the weight per axle per unit length of trucks or trailers allowable on public highway facilities. For example, California highway regulations require total vehicle weight to be less than 80,000 lbs, for vehicles having 5 axles and of a length less than 51 feet between the extreme spaced axles. For vehicles having 4 axles the spacing between the extreme axles must be at least 57 feet to carry 80,000 lbs. The Federal Government and many states place a limitation of 80,000 lbs. on total vehicle weight when loaded regardless of the number of axles.

Therefore, by simply making the transit mixer drum larger, thereby increasing the payload and weight but without increasing the length, the manufacturer and user may face violations of Federal or State Codes. Similarly, by making the transit mixers longer, as illustrated by multiaxle trailers, manueverability problems exist at the job site. Also, in the longer trailer transit mixer configurations insufficient drive wheel traction can occur at the job site, thus reducing the ability of the trailer transit mixer to negotiate adverse terrain. There are still further State and Federal highway regulations that limit the total weight allowable on a single axle or on tandem axle configurations.

SUMMARY OF THE INVENTION

In conformity with the myriad of Federal and State regulations, yet domonstrating optimum maneuverability at the construction site while increasing road stability and load carrying capability, a trailer transit mixer with a large sized mixing drum is disclosed in alternative configurations. In its extended state, the trailer transit mixer has the optimum allowable distribution of weight per axle per total vehicle length and extreme axle separation, as well as heighth limitations, thus complying with the applicable Federal and State Highway Regulations. In this manner greater pay load capability is realized thus reducing the cost per load of transporting the particular building material. In the contracted state, improved maneuverability and drive wheel traction are achieved. Moreover, in the contracted state, the open discharge end of the mixing drum is elevated to provide a greater span of reach for the discharge chutes. Also, the discharge is at the front of the truck allowing the driver to easily and accurately position the truck-trailer for concrete discharge.

Briefly, the trailer transit mixer of the present invention includes front and rear pairs of support members extending downward from a center frame which supports the mixer drum assembly. The lower portion of the rear support members may be pivotably or fixedly attached to a rear trailer wheel assembly while the lower portion of the front support members are always pivotally attached to the conventional fifth wheel assembly of the truck, sometimes referred to as the tractor. The upper portion of the front pair of support members is always pivotably attached to the center frame however the upper portion of the rear support members may be either pivotably or fixedly attached to the center frame depending upon the particular configuration to be used. The rear trailer wheel assembly comprises either the conventional two axle tandem wheel assembly or a single axle configuration. The center frame rotatably supports the mixer drum or the rotatable drum structure itself may act as a portion of the center frame.

Power units are secured to and extend between the front support members and the center frame to accomplish the contraction or expansion of the trailer transit mixer length depending upon whether the mixer is in transit or at the construction site. Power units may be present between the rear support members and the center frame or between the rear support members and the front support members depending upon the particular configuration desirable.

The length and angular movement of the front support members is such that in the contracted configuration the open discharge end is raised to a higher level than in the expanded state and positioned at the front of the truck whereby increasing discharge versatility and efficiency. With this feature, the trailer transit mixer in its extended configuration also complies with the maximum height requirements specified by the various Federal and State Highway Regulations.

Therefore, it is an object of the present invention to provide a trailer transit mixer with a selectively contracted and expanded wheel base configuration with the most desirable operating characteristics in both configurations.

It is another object of the present invention to provide a trailer transit mixer with power units operable to change the trailer configuration to provide increased loading of the drive wheels for traction when at the construction site.

It is still another object of the present invention to provide a trailer transit mixer which has increased maneuverability at the construction site by decreasing its overall length.

It is still another object of the present invention to provide a transit mixer which has a lower center of gravity when in road use yet able to discharge concrete from a raised position when at the job site.

It is still another object of the present invention to increase discharge efficiency by providing a raised, fully pivotable, discharge chute at the front of the vehicle.

It is still another object of the present invention to increase loading capacity yet remain within Federal and State regulations regarding height, weight per axle and truck length.

It is yet another object of the present invention to increase road maneuverability when in the unloaded state by being able to contract the trailer assembly.

It is yet another object of the present invention to provide a trailer transit mixer that uses a conventional truck and fifth wheel mount assembly which permits selected use of either a contractable trailer transit mixer or other conventional trailers.

With these and other objects in view, the invention consists of the construction, arrangement and combination of the various parts of the trailer transit mixer whereby the objects contemplated are attained, as hereinbefore set forth, pointed out in the appended claims and illustrated in the accompanying drawings.

IN THE DRAWINGS

FIG. 1 is a side elevation view of one form of the trailer transit mixer in the extended position.

FIG. 2 is a side elevation view of the trailer transit mixer of FIG. 1 in the contracted position.

FIG. 3 is a side elevation view of another form of a contractable trailer transit mixer in the extended position.

FIG. 4 is a side elevation view of the trailer transit mixer illustrated in FIG. 3 in the contracted position.

FIG. 5 is a side elevation view of a third form of trailer transit mixer in the extended position.

FIG. 6 is a side elevation view of the third form of trailer transit mixer shown in FIG. 5 in the contracted position.

FIG. 7 is a rear elevation view of the third form of trailer transit mixer illustrated in FIGS. 5 and 6.

FIG. 8 is an enlarged sectional side view of one form of a fifth wheel mounting assembly that is generally shown in FIGS. 1 through 4 but also is useable with the form shown in FIGS. 5 through 7.

FIG. 9 is a side elevation view of the trailer transit mixer illustrated in FIGS. 3 and 4 without power elements between the center frame and the rear support members.

FIG. 10 is a side elevation view of the trailer transit mixer shown in FIG. 9 in the contracted position.

FIG. 11 is a side elevation view of the trailer transit mixer illustrated in FIG. 5 wherein the rear tandem wheel assembly has been replaced by a single axel wheel configuration.

FIG. 12 is a side elevation view of the trailer transit mixer shown in FIG. 11 in the contracted position.

DESCRIPTION OF THE PREFERRED EMBODIMENT

As illustrated in FIGS. 1 and 2, a trailer transit mixer, generally designated as 10, has a conventional forward truck or tractor unit 12 having a cab section 14 and a rear section 16 with conventional tandem drive wheels 18. The trailer transit mixer 10 also has a rear wheel assembly 20, which in the preferred embodiment consists of tandem axles 21 with wheels 22 mounted thereon. The trailer portion 24 of the trailer transit mixer 10 extends generally from the rear section 16 to the rear wheel assembly 20.

The trailer transit mixer 10 has a mixer drum 30 which includes a forward conical section 32 and a generally cylindrical rear mixer body 34. A trailer frame 70 rotatably supports the mixer drum 30 and a frame section 71 extends forwardly to support a discharge body or hopper 36 at the open end of the mixer drum 30. A discharge chute 38 is attached to the hopper 36 and has 180° or greater freedom of movement. The discharge chute 38 may be provided with conventional means for causing its rotation or changing its angle of inclination.

A fifth wheel assembly 40 is secured to the rear section 16 of the truck 12 and provides for the normal freedom of movement of the trailer portion 24 relative to the truck 12 for turning. The fifth wheel assembly 40 has a pair of front pivots 42 adapted to support a pair of substantially parallel first support arms 50 of the trailer portion 24 to allow pivoting of the trailer portion 24 relative to the truck 12 about a transverse axis as the transit mixer 10 travels over uneven terrain.

Means are provided for causing the mixer drum 30 and trailer portion 24 to move from an extended position rearwardly of the truck 12 to a contracted position with a substantial portion of the mixer drum 30 positioned over the truck 12 and, as shown in the drawings, these means may include support arms 50 pivotably secured to the trailer frame 70 and power elements 80 secured therebetween for causing the pivoting of the support arms 50. The pair of first power elements 80 each have a rod portion 82 and piston portion 84, wherein the rod portion 82 of each is pivotally attached to the frame 70 at pivot 86 and the piston portion 84 of each is pivotally attached to the coplanar first arm 50 at pivot 88. The extension and retraction of the power elements 80 will cause the arms 50 to pivot at the fifth wheel assembly 40 and cause the mixer drum 30 and trailer portion 24 to move between the extended and contracted, respectively, positions relative to the truck 12, as shown in FIGS. 1 and 2.

Similarly, as shown in FIGS. 1 and 2, means are provided for causing the rear tandem axle wheels 22 of the trailer portion 24 to extend rearwardly beyond the mixer drum 30 or retract under or at least closer to the mixer drum 30 and, as shown in the drawings, these means may include support arms 60 pivotably connected to the rear wheel assembly 20 and the trailer frame 70 with power elements 90 secured therebetween for causing pivoting. The pair of substantially parallel second arms 60 are pivotably attached to the rear wheel assembly 20 at rear pivots 64. The second arms 60 each have a second swivel pin 62 by which they are pivotably secured to the frame 70. This arrangement also provides for pivoting of the wheel assembly 20 as the tandem axle wheels 22 proceed over bumps and dips. The pair of second power elements 90 each have a rod portion 92 and a piston portion 94. The rod portion 92 of each is attached to a second cradle 74 at pivot 96 and the piston portion 94 of each is attached to the coplanar second arm 60 at pivot 98.

As shown and discussed, the frame 70 has a first cradle 72 and a second cradle 74 attached thereto and suspended therefrom. The first cradle 72 and the second cradle 74 rotatably support the mixer drum 30 by customary methods to the frame 70. As stated earlier, the frame 70 is pivotably attached to and supported by the first arms 50 at swivel pins 52 and the second arms 60 at second swivel pins 62.

In FIG. 2, the trailer transit mixer 10 is shown in the contracted configuration. The rear wheel assembly 20 is brought into closer proximity with the rear section 16 by the combined action of the first power elements 80 and the second power elements 90. By actuating the first power elements 80 the telescoping action reduces the obtuse angle between the first arms 50 and the frame 70 to an acute angle. Similarly, by actuating the second power elements 90 the telescoping action reduces the obtuse angle between the second arms 60 and the frame 70 to an acute angle. The transverse or lateral pivotal axes provides by parallel pivots 42, swivel pins 52, swivel pins 62, and rear pivots 64 permit contraction of the trailer portion 24. This contraction moves the center of gravity of the trailer portion 24 toward the truck 12 thereby causing increased weight upon the drive wheels 18 to improve their traction capability. Because the first arms 50 are longer than the second arms 60, this contraction simultaneously raises the discharge means 36 to a higher level thereby improving the discharge versatility of the chute 38.

In the extended position as shown in FIG. 1, a lower center of gravity for the trailer transit mixer 10 is accomplished due to lowering the mixer drum 30 and frame 70, as well as a lower weight per axel and longer unit length are provided. Turning capability is retained in either the contracted or expanded configuration because of the rotably mounted fifth wheel assembly 40, however, increased maneuverability is shown in the contracted configuration because of a reduced overall length.

In the above-described embodiment, trailer transit mixer 10 of this invention and in the embodiments described hereinafter, appropriate conventional means (not shown) are provided for selectively causing rotation of the mixer drum 30 in either direction about its inclined axis for mixing and discharging the concrete. Such means may comprise an auxiliary engine mounted on the trailer frame 70 or rear wheel assembly 20 for powering conventional means, such as a transmission and chain drive or hydraulic pump and motor drive, or even a power take-off from the truck's engine, driving an hydraulic pump which in turn drives an hydraulic motor and gear drive mounted on the end of the mixer drum as described in U.S. Pat. No. 3,658,303.

An alternative configuration of a trailer transit mixer, generally designated as 110, is illustrated in FIGS. 3 and 4. In general, a pair of drive wheels 18 are mounted to a rear truck platform 116; a rear wheel assembly 120 has mounted thereon a pair of tandem wheels 122; and a trailer portion 124 extends from the rear platform 116 to the rear wheel assembly 120, all similar to the first embodiment of FIGS. 1 and 2.

A mixer drum 130 has a forward conical section 132 and a cylindrical rear section 134. The drum 130 has a rearward extension 133 that is rotatably supported by a cradle frame 174 which may also include the means for driving the drum. A frame section 171 extends forwardly from the front cradle frame 172 and supports a discharge hopper 136 at the open end of the drum 130. The discharge hopper 136 has a chute 138 pivotally attached thereto which as a 180° or greater freedom of movement.

The rear truck platform 116 has a fifth wheel assembly 140 rotatably attached thereto providing horizontal freedom of movement for the trailer portion 124. The fifth wheel assembly 140 has lower pivots 142 adapted to support a pair of first support members 150 with the first support members 150 each having an upper swivel pin 152 adapted to provide pivotal attachment to a cradle frame 172. A pair second support members 160 each have an upper swivel pin 162 for causing pivotal attachment to cradle frame 174 and a lower pivot 164 for causing pivotal attachment to the rear wheel assembly 120.

As illustrated in FIGS. 3 and 4, the frame section 171 has a support or cradle frame 172 rigidly attached thereto which rotatably supports the front of the mixer drum 130; the frame 172 provides pivotal attachment of the first support members 150 at swivel pins 152. A second support or cradle frame 174 supports section 133 at the rear of the drum 130 and is pivotably secured to the second support members 160 by swivel pins 162. In this manner the drum 130 itself forms an integral part of the frame of trailer 124.

A pair of first power elements 180 each have a rod portion 182 and a piston portion 184, wherein the rod portion 182 of each is attached to the frame 171 at an upper pivot 186, and the piston portion 184 of each is attached to the coplanar first support member 150 at lower pivot 188. A pair of second power elements 190 each have a rod portion 192 and a piston portion 194, wherein the rod portion 192 of each is attached to the cradle frame 174 by a first pivot 196 and the piston portion 194 of each is attached to the coplanar second support member 160 at a second pivot 198.

In FIG. 4, the trailer transmit mixer 110 is shown in a contracted configuration. Briefly, the first power elements 180 when actuated impart a force upon the frame section 171 thereby increasing the angle between the frame section 171 and the first support members 150. The first power elements 180 pivot about their respective upper pivots 186 and similarly pivot about their respective lower pivots 188, thus facilitating the movement of the frame members 171 and 172 with respect to the support members 150.

At the rear wheel assembly 120, the second power elements 190 impart a force upon the cradle frame 174 and a similar force on the second support members 160. This action reduces the angle between the cradle frame 174 and the second support members 160, thereby causing the desired contracted configuration. The second power elements 190 pivot about their respective first pivots 196 and similarly pivot about their respective second pivots 198 facilitating the reduction of the angle between the support members 160 and cradle frame 174.

When contracted, the trailer transit mixer 110 is provided with greater horizontal maneuverability by reducing the length of the trailer portion 124. As stated with respect to the first configuration, in the contracted state the trailer transit mixer 110 has greater drive capability because of the increased axle loading over the drive wheels 118. Similarly, the discharge chute 138 is raised to a superior position due to the length and repositioning of the first support members 150. This provides for greater operational flexibility in the discharge of the mixture contained within the drum 130. As discussed previously, a drive means and support assembly (not shown) may be found on the rear wheel assembly 120 or within the second cradle 174 to cause rotation of the drum 130 for mixing and discharge of the concrete carried therein.

In FIGS. 5, 6, and 7, a third alternative embodiment of a trailer transit mixer of this invention is illustrated and designated generally 210. It consists of a rear platform 216 under which tandem drive wheels 218 are mounted; a rear wheel assembly 220 which has tandem wheels 222 mounted thereon and a trailer portion 224 which extends from the rear platform 216 to the rear wheel assembly 220.

A mixer drum 230 has a conical section 232 and cylindrical rear mixer section 234. An accumulator and discharge device 235 and an upper charging hopper 236 are mounted on the frame sections 271 and 271a extending forwardly along the conical drum section 232. A discharge chute 238 attached to the discharge device 235 has a chute extension 237 attached by a hinge 239 which provides for extended operation or compact storage while the mixer 210 is in transit.

A fifth wheel assembly 240 has a pair of front pivots 242 adapted to provide longitudinal support and rotation of the first carriage members 250. The fifth wheel assembly 240 in addition has a lower fifth wheel assembly 244 rotatably secured thereto. The lower fifth wheel assembly 244 has a fulcrum 245 which attaches it to a truck fifth wheel assembly 246, this assembly 246 providing turning capability for the trailer portion 224. A locking member (not shown) extends between the fifth wheel assembly 240 and the lower fifth wheel assembly 244 when the trailer portion 224 is being used to prevent pivoting about both of the parallel axes thereof. Removal of the locking member provides for attachment of other trailer forms to the conventional, pivoting lower fifth wheel assembly 244 in the normal manner.

A pair of first carriage members 250 each have an upper swivel pin 252 within a mount 254 secured to the frame 270. Additionally, the first carriage members 250 each have a power element mount 258 along their length. The first carriage members 250 are pivotably secured to the fifth wheel assembly 240 at front pivots 242, which provide for rotation of the first carriage members 250 about the pivots 242 depending upon the terrain over which the trailer is to travel.

A pair of second carriage members 260 each have swivel pins 262 disposed within a pair of mounts 264 integral with the frame 270. The second carriage members 260 are pivotably attached to the rear wheel assembly 220 at rear pivots 264, this configuration providing rotation of the second carriage members 260 about the rear pivots 264.

The frame 270 has a pair of first support legs or cradles 272 and a pair of second support legs 274 attached and extending therefrom for rotatably suspending the drum 230. The frame 270 also has a pair of angular support beams 275 and a pair of support braces 276 attached thereto, wherein the pair of angular support beams 275 are rigidly secured to the support legs 274 as are the support braces 276.

A pair of first power elements 280 each have a rod portion 282 and piston portion 284 designed for telescopic engagement. The rod portion 282 of each is attached to the coplanar first carriage member 250 at the mount 258 by an upper pivot 286. The piston portion 284 of each first power element 280 is attached to the second support leg 274 at a lower pivot 288.

A pair of second power elements 290 each have a rod portion 292 and a piston portion 294 also designed for telescopic engagement. The rod portion 292 of each is attached to the coplanar second carriage member 260 at an upper pivot 296. The piston portion 294 of each second power element 290 is attached to the coplanar second support leg 274 at a lower pivot 298.

For elevating and lowering the discharge chute 238, a third power element 300 is attached between the chute 238 and the discharge accumulator 235 and may be operated remotely, as is relatively conventional. Also, remotely controlled means, not shown, may be used for pivoting the discharge chute to aim in the desired direction.

Referring to FIG. 6, the trailer transit mixer 210 is illustrated in a contracted configuration. The first power elements 280 act upon the first carriage members 250 and the second support legs 274 of frame 270. The second power elements 290 act upon the second carriage members 260 and the second support legs 274 of frame 270. By this combined action the trailer portion 224 is contracted thus causing a forward and upward shifting of the mixer drum 230.

As stated previously, the fifth wheel assembly 240 is attached to the lower fifth wheel assembly 244 via a lock when the trailer transit mixer 210 is to be used for concrete hauling and mixing functions. The same truck unit 212 may be used with the second fifth wheel assembly 246 and the lower fifth wheel assembly 244 when the lock is not present to haul conventional trailers or rigs. In this manner maximum flexibility is attained and various functions may be performed by the truck portion 212.

In FIG. 7, a rear elevation of the trailer transit mixer 210 is illustrated. Briefly, the drum 230 is rotatably suspended within the frame 270 and the angular frame 274. The carriage members 260 are also illustrated disposed between the rear pivots 264 and the rear wheel assembly 220. The pivotal attachment of the second power elements 290 to the carriage members 260 at pivot 296 is further illustrated. The drum drive and support mechanism 302 is shown and may be of of type described in U.S. Pat. No. 3,658,303 as previously mentioned.

In FIG. 8, the preferred form of fifth wheel attachment assembly, generally designated 340, is shown. A conventional, rigid-type fifth wheel 341 is fixedly mounted on the truck frame portion 316 and has an upper support surface 343 on which a plate 304 of bracket 306 is supported. Bracket 306 contains the pivot 342 equivalent to pivots 42, 142, and 242 heretofore described for pivotally mounting the carriage member 350 of the trailer. The plate 304 has a downwardly extending pin 308 with an enlargement for engaging the slot 309 in the fifth wheel 341 in the conventional manner.

In FIGS. 9 and 10 the embodiment of FIGS. 3 and 4 is shown with a modified rear wheel assembly 420. The second support arms 460 are fixedly engaged to the support cradle 474 with a beam 462 disposed therebetween and rigidly attached to the arms 460 and cradle 474. The tandem wheels 422 remain attached to the platform 463 which is pivotably attached to the support arm 460 at pivot 464.

FIG. 10 illustrates this embodiment in a contracted configuration wherein the rear wheel assembly 420 is brought more proximal to the wheels 418 by the action of the power elements 480. It should be apparent that other forms and configurations supporting the drum 430 may be devised which illustrate non-pivotal attachment of the support arms 460 to the cradle 474. It should also be apparent that a similar configuration may be utilized with the embodiment of FIGS. 1 and 2 of FIGS. 5, 6 and 7 thereby relieving the necessity of having a second power means 90 or 290.

Still another embodiment of the present invention is shown in FIGS. 11 and 12. This particular configuration is similar to that shown in FIGS. 5, 6, and 7, except that a single axel arrangement is shown instead of the more conventional tandem wheel arrangement of the above illustrated embodiments. Briefly, a second support member 560 is fixedly attached to the frame 570 and extends downwardly therefrom. The second support member 560 is rigidly secured a beam 562 which is attached to the cradle 576. A single axle wheel assembly 520 is located at the engagement of the support member 560 and the beam 562. As shown in FIG. 12, in the contracted state the wheel assembly 520 is brought into a more proximal relationship with the wheels 518 by the action of the power elements 580. This action, as in the other embodiments, occasions a contraction of the transit mixer 510 for loaded off-highway use or unloaded on-highway use. It should be noted that although the single axle wheel assembly 520 is shown only with this embodiment it may be incorporated with the other embodiments previously discussed to achieve the same objective.

In all of the above configurations, the same basic objectives are achieved. When in road use, the trailer transit mixers 10, 110, 210, 410 and 510 have a low center of gravity thereby providing improved road handling. When at the construction site the contracted configuration of the trailer transit mixers 10, 110, 210, 410, and 510 provides greater traction by the drive wheels 18, 118, 218, 418 and 518. Similarly, the discharge chutes 38, 138, 238, 438 and 538 are raised to a higher position because of the lengths and angular positions of the members 50, 150, 250, 450, and 550. In each instance turning capability between the truck and trailer is provided by the fifth wheel assembly 40, 140, 240, 440 and 540 and greater maneuverability arises in the contracted state due to the shorter overall length. Also in each configuration, the extended form increases the pay load capability thereby decreasing cost per unit of concrete shipped. It should also be noted that the contracted configuration may also be used for on-highway unloaded operation thereby improving the mixer's road handling.

Referring briefly to FIGS. 5, 6, and 7, an illustration of the axle loading for the preferred embodiment will be described. As discussed earlier, representative California and Federal law allows as a maximum 80,000 lbs. gross weight for trailers regardless of length. When fully loaded with approximately 11 yards of concrete the shortest 5 axle trailer configuration for which this 80,000 lbs. will be permitted by a California or Federal law is approximately 51 feet in overall length between the extreme axles. In the preferred embodiment, the transit mixer is 50 feet 9 inches in the expanded configuration from front axle 213 to rear axle 221. In the contracted configuration, the transit mixer is only about 29 feet in overall length, a contraction of about 22 feet.

In the expanded state, with a total weight of 80,000 lbs. the axle loading of the tractor tandem wheels 218 and the trailer tandem wheels 222 is equal at 34,000 lbs. In the contracted configuration, however, the loading changes to 50,000 lbs. on tractor wheels 218 and 15,000 lbs. on trailer wheels 222. The 50,000 lbs. acts directly upon the drive wheels 218 thereby improving their traction. It should be noted that when 4 axle configurations are utilized the minimum length required to carry 80,000 lbs. is 57 feet, therefore single axle assembly embodiments as shown in FIGS. 11 and 12 will have to be longer in overall length to achieve maximum payload capability. It should be noted that other state and foreign laws may require maximum weights of less than 80,000 lbs. and lengths shorter than 51 feet for maximum loads. The invention of the present application may be modified to comply with these laws without departing from the spirit of the invention.

In the preferred embodiment, the axle weight distribution per unit truck length permits a payload of 10 to 11 cubic yards of concrete to be hauled. This is approximately 150% of the carrying capability of a contemporary 3 axle transit mixers and more than 125% of the load carrying capability of a contemporary 4 axle transit mixers under the same weight law regulations. Thus this increased carrying capability dramatically reduces the cost of transportation and energy requirements in concrete construction. Lastly, because of the lengths of the support members 250, in the preferred embodiment, the height of the transit mixer increases from approximately 11 feet 8 inches to approximately 14 feet 10 inches thus increasing the discharge radius and/or angle of the discharge chutes when at the construction site, while remaining within the applicable laws regarding maximum height while on the road.

It should be apparent that the various single axle and tandem axle arrangements may be utilized with any of the aforementioned embodiments without departing from the spirit of the invention.

Having fully described my invention, it is to be understood that I do not wish to be limited to the details herein set forth, but that my invention is of the full scope of the appended claims.

I claim:

1. In a trailer transit mixer for use with a truck having a fifth wheel assembly, the improvement comprising, a mixer drum assembly including a rotatable mixer drum with an open end, a trailer wheel assembly having means supporting one end of said mixer drum assembly, means supporting the other end of said mixer drum assembly on the truck fifth wheel assembly, at least one of said supporting means selectively operable to shift the longitudinal position of said drum forward and rearward relative to the truck, the selective operation of said supporting means to the forward position causing the said open end of said mixer drum to be elevated substantially for allowing discharge of the contents of said mixer drum while permitting forward, rearward and turning movement of the truck in all directions.

2. The trailer transit mixer of claim 1, wherein said selectively operable means supporting said mixer drum assembly include pivotably mounted support arms and power means for causing pivoting of said arms to shift the longitudinal position of said mixer drum.

3. The trailer transit mixer of claim 1, wherein said selective operation shifts the trailer wheel assembly between the rearward position substantially rearward of the truck for highway operation with the mixer drum loaded and the forward position with the trailer wheel assembly positioned near the truck for off-highway and unloaded on-highway operation.

4. In a trailer transit mixer for use with a truck having a fifth wheel assembly, the improvement comprising, a mixer drum assembly including a rotatable mixer drum with an open forward end, a trailer wheel assembly having means supporting one end of said mixer drum assembly, means on the truck fifth wheel assembly supporting the other end of said mixer drum assembly, at least one of said supporting means being selectively operable to shift the longitudinal position of said drum forward and rearward relative to the truck, the selective operation of said supporting means to the forward position causing the said forward end of said mixer drum to be elevated substantially and extend over the front of the truck without obstructing movement of the truck for discharging the contents of said mixer drum beyond the front of the truck.

5. The trailer transmit mixer of claim 4, wherein said selectively operable means supporting said mixer drum assembly include pivotally mounted support arms and power means for causing pivoting of said arms to shift the longitudinal position of said mixer drum.

6. In a trailer transit mixer for use with a truck having a fifth wheel assembly, the improvement comprising, a mixer drum assembly including a mixer drum and means operatively supporting said drum, a trailer wheel assembly supporting one end of said mixer drum assembly, means supporting the other end of said mixer drum assembly on the truck fifth wheel assembly and selectively operable to shift the longitudinal position of said drum forward and rearward relative to the truck, the selective operation of said supporting means to the forward position causing the said other end of said mixer drum to be elevated substantially and extend over the front of the truck without obstructing movement of the truck, and said other end having an opening and means associated therewith for discharging the contents of said mixer drum beyond the front of the truck.

7. The trailer transit mixer of claim 6, wherein said selectively operable means supporting said mixer drum assembly include pivotably mounted support arms and power means for causing pivoting of said arms to shift the longitudinal position of said mixer drum.

8. A transit mixer, said mixer comprising,
a truck tractor unit having a fifth wheel assembly,
a support arm means extending upwardly from and pivotably attached to said fifth wheel assembly,
a frame having a forward portion pivotably attached to said support arm means,
a trailer wheel assembly having the rearward portion of said frame supported thereon,
a mixer drum rotatably supported on said frame with an open end facing forward, and
power means extending between and attached to said support arm means and said frame for pivoting said support arm means between a rearward-upward position and a forward-upward position for causing said frame and mixer drum to shift from a rearward position to a forward position with the mixer drum open end substantially elevated to above the truck tractor unit and near the front thereof.

9. A transit mixer, said mixer comprising, a truck tractor unit, a fifth wheel assembly rotatably attached to said truck tractor unit, a rear wheel assembly, arm means extending upwardly from said fifth wheel assembly and pivotably attached thereto, a mixer drum assembly pivotably attached to said arm means, means supporting the mixer drum assembly on said rear wheel assembly, and power means operatively connected to said arms and for causing pivoting of said arm means and forward shifting of said mixer drum assembly.

10. In a trailer transit mixer for use with a truck having a fifth wheel assembly, the improvement comprising, a mixer drum assembly including a mixer drum and means operatively supporting said drum, a trailer wheel assembly, means supporting one end of said mixer drum assembly on said trailer wheel assembly, means supporting the other end of said mixer drum assembly on the truck fifth wheel assembly and selectively operable to shift the longitudinal position of said drum relative to the truck, the selective operation of said supporting means causing the said other end of said mixer drum to extend over the front of the truck without obstructing movement of the truck, and said other end having an opening and means associated therewith for discharging the contents of said mixer drum beyond the front of the truck.

11. The trailer transit mixer of claim 10, wherein said selectively operable means supporting said mixer drum assembly include pivotal mounted support arms and power means for causing pivoting of said arms to shift the longitudinal position of said mixer drum.

12. The trailer transit mixer of claim 11, wherein a first pair of said arms support said mixer drum assembly from said trailer wheel assembly and a second pair of said arms support said mixer drum assembly from the truck fifth wheel assembly.

* * * * *